Oct. 27, 1964  D. I. THORNTON ETAL  3,154,487
DUAL FLUID FILTERS
Filed Nov. 16, 1962  2 Sheets-Sheet 1

INVENTORS
DONALD I. THORNTON
CHESTER A. VANDERPYL, JR.
BY
Charles C. Willson
ATTORNEY Oct. 27, 1964     D. I. THORNTON ETAL     3,154,487
DUAL FLUID FILTERS
Filed Nov. 16, 1962     2 Sheets-Sheet 2
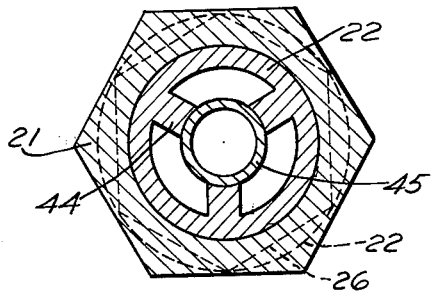
FIG. 5
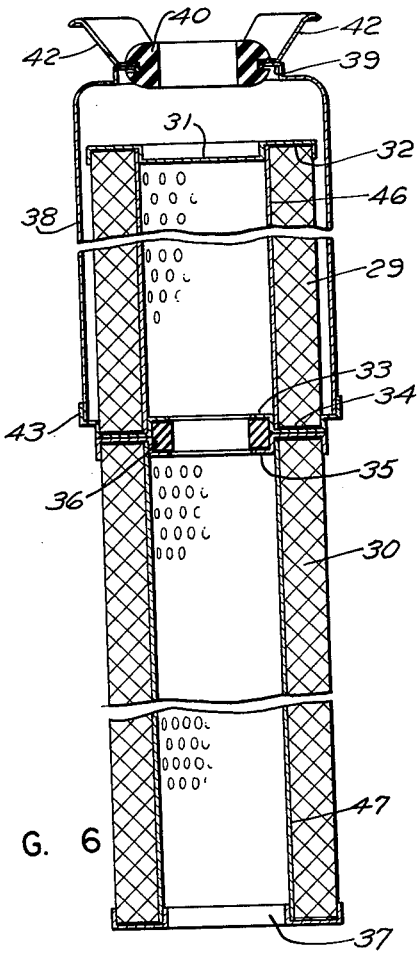
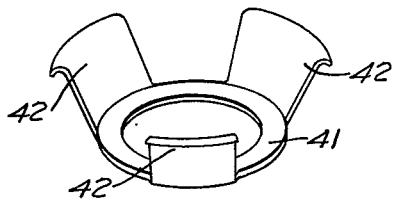
FIG. 7
FIG. 6
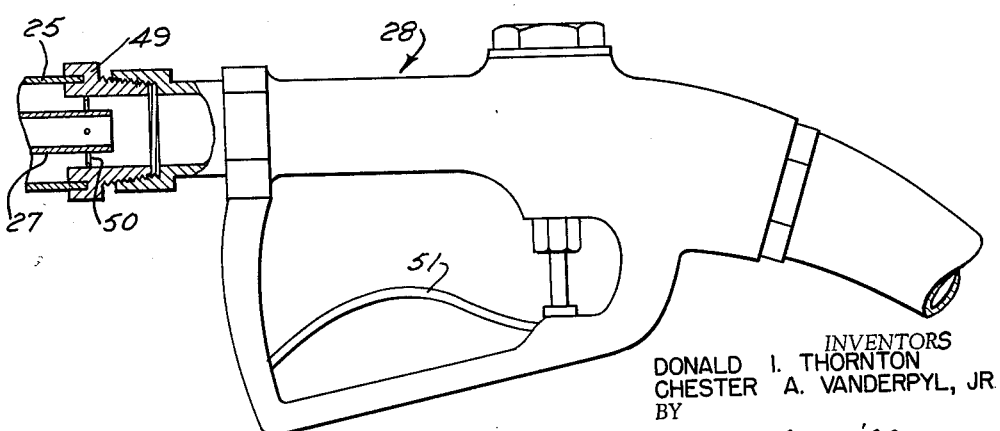
FIG. 8
INVENTORS
DONALD I. THORNTON
CHESTER A. VANDERPYL, JR.
BY
Charles C. Willson
ATTORNEY

United States Patent Office 3,154,487
Patented Oct. 27, 1964

3,154,487
DUAL FLUID FILTERS
Donald I. Thornton and Chester A. Vander Pyl, Jr., Warwick, R.I., assignors to Fram Corporation, Providence, R.I., a corporation of Rhode Island
Filed Nov. 16, 1962, Ser. No. 238,103
2 Claims. (Cl. 210—323)

This invention relates to dual fluid filters, and more particularly to an in-line dual filter for simultaneously filtering two fluids while maintaining complete separation of the fluids.

The dual fluid filter of the present invention is well adapted for use upon a dual gasoline dispensing pump such as the "Custom Blending" pump now in use to deliver two types of gasoline through an inner and outer hose to a single discharge nozzle. The dual filter of the present invention is designed to filter separately each type of gasoline or other fuel so that these two types of fuel will not mix until they reach the fuel discharge nozzle at the outer end of the dual fuel hose.

The dual filter of the present invention may be employed to filter simultaneously without mixing various fluids such as (1) two gases, (2) a liquid and a gas, or (3) two liquids. It is particularly well adapted for use with a dual hose where one hose is inside the other, as in a number of the dual gasoline dispensing pumps now in use.

The present invention in its preferred embodiment comprises a relatively long cylindrical body or shell having removably mounted therein two cylinder shaped filter cartridges disposed in axial alignment.

In order to maintain complete separation of the two fluids while they are in the filter housing, the housing preferably has at one end thereof two inlets one of which surrounds the other, and at the other end two outlets one of which surrounds the other. When the two filter cartridges are in place in the housing the fluid from the inner inlet passes to and through one cartridge and then to an outlet, and the fluid from the outer inlet passes through the other cartridge and then to the second outlet, so that the two fluids passing through the filter housing are separately filtered therein without being mixed.

The two filter cartridges may be variously constructed and may be identical or different in size and filtering capacity. The Custom Blending pump above mentioned is usually constructed so that it will deliver to the hose discharge nozzle from zero to forty percent high test fuel, while delivering anywhere from sixty to one hundred percent low test fuel. Therefore the dual filters for these pumps preferably have a larger capacity cartridge for the low test fuel than for the high test fuel. These two cartridges are preferably secured one to the other so that both are replaced as a unit when they become dirty.

Custom Blending dispensing pumps are usually provided with two concentric hoses extending from the pump to the nozzle so that the inner hose will deliver the high test fuel to the nozzle while the low test fuel is delivered by the outer hose to such nozzle. If a single hose should be used for dispensing the two different fuels, the customer would receive a hose full of fuel having the blend ordered by the previous customer. Therefore, to comply with the usual blending practices, a dual filter such as herein contemplated is provided so that the two fuels will not mix until after they are separately filtered and delivered to the fuel discharge nozzle.

While the dual filter of the present invention may, as above stated, be used to filter various fluids, it was developed primarily for use upon dual fuel pumps and is therefore so shown in the drawings and hereinafter described.

Figure 2:
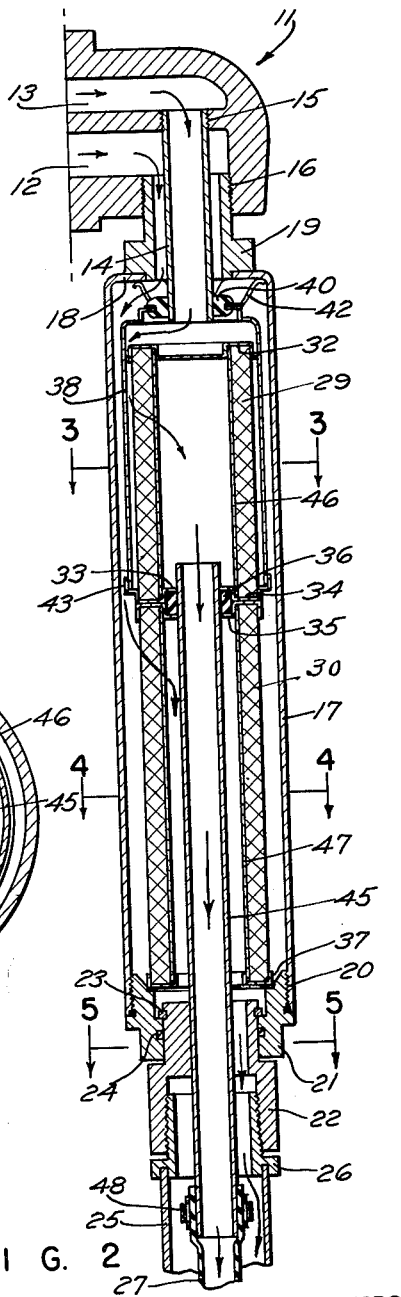
FIG. 2 is a longitudinal vertical section through the dual filter of the present invention shown attached to its supporting fuel delivery elbow.
Figure 3:
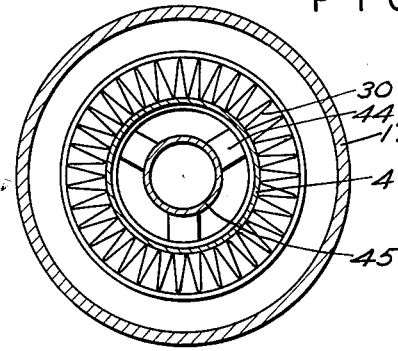
Figure 4:
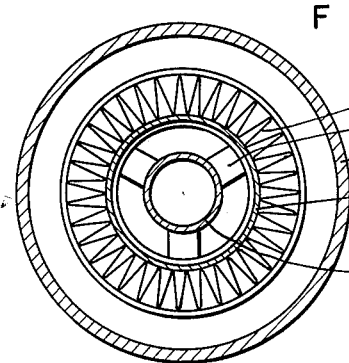

FIG. 3 is a section taken on the line 3—3 of FIG. 2.
FIG. 4 is a section taken on the line 4—4 of FIG. 2.
FIG. 5 is a section taken on the line 5—5 of FIG. 2.
FIG. 6 is a longitudinal vertical section through the two filter cartridges removed as a unit from the filter housing.

FIG. 7 is a perspective view of an annular hold-down spring to be described; and FIG. 8 is a side elevation with parts in section of a fuel delivery nozzle attached to the dual type of delivery hose.

Figure 1:
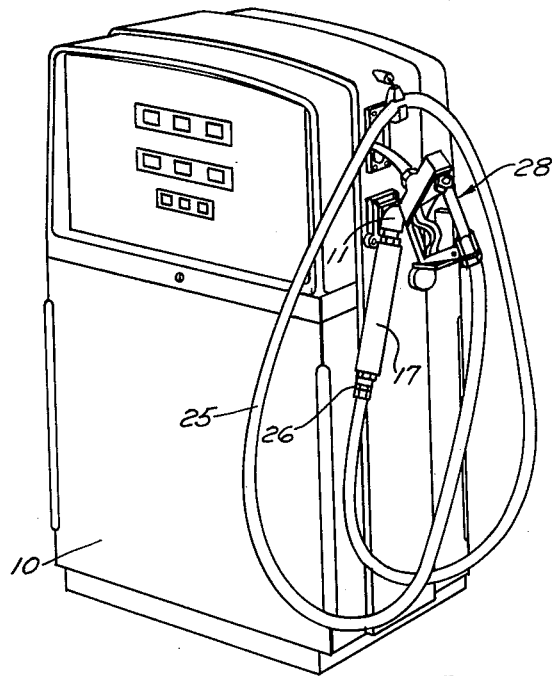
FIG. 1 is a perspective view of a dual type of fuel delivery pump equipped with the dual fuel filter of the present invention, the filter being located close to the pump.

The fuel pump of FIG. 1 of the drawing which is designated in its entirety by the numeral 10 is preferably of commercial construction and has two pumps, one connected to a high test fuel tank and the other connected to a low test fuel tank, and operable by control means to deliver different quantities of each fuel to a delivery nozzle to supply a customer with the fuel blend he has requested.

This fuel pump has secured thereto the usual type of fuel delivery elbow 11 which is bolted to a wall of the fuel pump and has the central fuel passage 12 for delivering low test fuel, and the surrounding fuel passage 13 for delivering high test fuel through the centrally disposed, downwardly extending pipe 14. This pipe 14 is threaded at its upper end as indicated by 15 and is screwed into an inner wall of the elbow member. This elbow has a relatively large internally threaded outlet 16 adapted to receive the threaded end portion, to be described, of the dual fuel filter of the present invention.

Now referring more particularly to FIG. 2, it will be seen that the outlet elbow 11 has extending downwardly therefrom the dual fuel filter having the relatively long tubular housing 17 that is bent inwardly at its upper end, as indicated by 18, and to this upper end is welded or otherwise secured the externally threaded sleeve or nut 19. This nut is screwed into the threaded portion 16 of the elbow 11. The lower end of the housing 17 is internally threaded as indicated by 20 and is adapted to receive the externally threaded nut or sleeve 21. This sleeve can be removed from the housing 17 so that the dual filter cartridges, to be described, can be inserted and removed through this lower end of the housing 17. The sleeve 21 is shown as having rotatably secured thereto the swivel 22. The upper end of this swivel fits rotatably in the annular bore of the sleeve 21 and is secured therein by the annular spring 23 which is adapted to be snapped into an annular groove formed in the upper portion of the neck of the swivel to retain such swivel rotatably within the sleeve 221. An annular gasket 24 is provided to prevent leakage between the bore of the sleeve 21 and the swivel that rotates therein. While this swivel is not essential it is desirable as it makes it much easier to service the filter when installed between the pump and the long dual fuel delivery hose 25. Such hose has permanently secured to the outer tube thereof at the fuel-receiving end the externally threaded sleeve 26 which is adapted to be screwed into engagement with the internally threaded lower end of the swivel 22. Within the fuel hose 25 is provided the smaller fuel hose 27 which, as shown, serves to deliver the high test fuel to the fuel delivery nozzle 28 shown in FIGS. 1 and 8.

The filter housing 17 is adapted to receive therein the filter unit best shown in FIG. 6 and having the upper filter cartridge 29 and lower filter cartdige 30. Each of these cartridges may be formed of pleated paper in a well-known manner or of other filter material, each pleated element being arranged in the form of a cylinder as shown in FIGS. 3 and 4. The upper cartridge 29 has its upper end closed by a metal plate or disc 31 which is formed with a recessed annular portion that is bonded to the upper ends of the pleats by a bonding agent 32, and to the lower end of this cartridge is similarly secured a metal ring 33 which is bonded to the lower ends of the pleats by a bonding agent 34. This lower ring 33 has a central outlet opening.

The lower cartridge 30 has its upper end closed by a metal ring 35 which may be identical to the ring 33 and is secured to the upper ends of the pleats 30 by a suitable bonding agent. The metal rings 33 and 35 are preferably bonded one to the other so that the two cartridges are rigidly secured one to the other and are inserted and removed from the filter housing as a unit. These two end rings 33 and 35 have the central offset recessed portions shown to receive the gasket 36 formed of rubber or other suitable material. The lower end of the cartridge 30 has bonded thereto a metal ring 37 which has a central opening like rings 33 and 35.

The dual filter of the present invention is so designed that it will filter the two types of fuel or other fluid delivered thereto without mixing within the filter housing, and an important feature of the present invention resides in the construction whereby the fuel delivered by the elbow passage 12 will pass through one filter cartridge and that delivered by the elbow passage 13 will pass through the other filter cartridge, and the filtrates from the two cartridges pass out of the filter housing without mixing. This result is secured in accordance with the present invention by providing a tubular jacket 38 that completely surrounds the upper cartridge 29. This jacket is provided at its upper end with the inwardly extending annular rim 39 which is adapted to extend into an annular recess formed about the ring gasket 40 as shown in FIG. 6. The annular groove formed in this gasket 40 is adapted to receive also the ring portion of the hold-down spring 41 that is best shown in FIG. 7, and which has the three upwardly extending resilient prongs 42. The gasket 40 can be distorted to receive the embracing portions 39 and 41. The lower end portion of the annular jacket 38 fits snugly in an upwardly extended annular flange 43 of the end closure member 33, and this annular flange 43 is welded or otherwise tightly secured to the lower end of the jacket 38.

When it is desired to insert the dual filter unit of FIG. 6 in its operating position in the filter housing of FIG. 2, such filter unit is inserted through the lower end of the housing far enough to cause the annular gasket 40 to snugly embrace the lower end of the downwardly extending fuel delivery tube 14, so that the fuel passing downwardly through this tube will flow around the filter cartridge 29 and pass inwardly through this cartridge, as indicated by the arrows in FIG. 2.

In order that this fuel, after it has passed through the cartridge 29, will pass out of the filter housing without contacting the other fuel, the swivel 22 is provided with three inwardly extending ribs 44 having flow channels between them as shown in FIG. 5. These ribs are welded or otherwise rigidly secured to a relatively long upwardly extending metal tube 45. As the closure nut 21 is moved into engagement with the lower end of the housing 17, the upper end of the tube 45 will be forced upwardly through the gasket 36 to form a tight fit between such gasket and the outer wall of this tube, so that the filtrate from the upper cartridge 29 will pass downwardly through this long tube 45, as indicated by the arrows in FIG. 2. The upper cartridge 29 is preferably provided at its inner surface with a reinforcing, perforated tube 46, and the lower cartridge is preferably provided with a similar perforated reinforcing tube 47.

Referring to FIG. 2 it will be seen that the low test fuel from the central passage 12 of the elbow 11 passes downwardly through the sleeve 19 about the central tube 14 to flow downwardly in the space between the inner wall of the housing 17 and the outer wall of the jacket 38 to reach the lower cartridge 30, whereupon it passes inwardly through such cartridge, as indicated by the arrows. It then flows downwardly between the inner wall of the reinforcing tube 47 and the outer wall of the long tube 45 to pass through the swivel 22 in the spaces between the ribs 44. It then passes into the outer hose 25 in surrounding relation to the inner hose 27. This end of the inner hose 27 fits snugly about the lower end of the tube 45 and is secured thereto by the clamping band 48. As the closure nut 21 at the lower end of the housing 17 is screwed home, it will force the dual cartridge unit upwardly to cause the hold-down spring 41, 42 to engage the inwardly extending portion 18 at the upper end of the housing. This will cause the prongs 42 to exert sufficient downward pressure on the dual filter unit to cause the lower closure ring 37 of such unit to sealingly engage a gasket provided between this ring 37 nad a shoulder at the upper end of the closure nut 21.

The dual filter of the present invention has been shown as secured to the elbow 11 close to the fuel pump and at the intake end of the dual hose so that its weight will not be added to that portion of the long flexible hose that has to be manipulated in delivering fuel to the tank of a motor vehicle by means of the discharge nozzle best shown in FIG. 8. This nozzle 28 may be of usual construction and the discharge end of the outer hose 25 has firmly secured thereto the externally threaded nut 49 which is adapted to be screwed into engagement with the fuel-receiving end of the nozzle 28. It is desirable to keep the inner tube 26 centrally spaced within the bore of the nozzle. This is easily done by providing a wire ring or spring 50 having a central end portion which may be pierced through the wall of the inner tube to retain this spacing ring in place on the tube and within the bore of the nut 49. The nozzle 28 is shown as having the usual valve tripping member 51.

By observing the arrows shown in FIG. 2 of the drawings, it will be seen how the high test fuel passing downwardly through the center pipe 14 flows to and through the upper filter cartridge 29 and then through the long pipe 45 to enter the inner hose 27, and how the low test fuel entering through the elbow passage 12 passes downwardly within the housing 17 around the jacket 38 out of contact with the upper cartridge to pass inwardly through the lower cartridge and then enter the outer hose 25 so that these two fuels do not mix until they reach the discharge nozzle 28.

Having thus described our invention what we claim and desire to protect by Letters Patent is:

1. A dual fluid filter for filtering separately therein two different fluids; said filter comprising
   an elongated filter housing having at one end thereof two separate inlets, one of which surrounds the other, and having at the other end thereof two separate outlets, one of which surrounds the other,
   two filter cartridges in said housing in end-to-end axial alignment with each other, one cartridge for each of said two different fluids,
   tubular means in said housing for delivering a first fluid from a first one of said inlets to a first one of said cartridges to pass therethrough and then to a first one of said outlets and
   another tubular means in said housing surrounding the first cartridge for delivering the other fluid from the second one of said inlets to the second one of said cartridges to pass therethrough and then to the second of said outlets,
   whereby the two fluids passing through said housing are separately filtered by the cartridges therein without mixing in the housing.

2. A dual liquid filter for filtering separately and simultaneously therein two types of liquid fuels; said filter comprising
    an elongated cylindrical filter housing having at one end thereof two separate inlets, an inner one and an outer concentric one which surrounds the other, and having at its other end two separate outlets, an inner one and an outer concentric one which surrounds the other.
    two generally cylindrical filter cartridges removably mounted in the housing in end-to-end axial alignment with each other, one cartridge for each type of liquid fuel,
    tubular means in the housing for delivering a first fuel from the first inner one of said inlets to a first one of said cartridges to pass therethrough and then to the first inner one of said outlets and
    a tubular jacket in the housing surrounding the first cartridge for delivering the other fuel from the outer second one of said inlets to the second one of said cartridges to pass therethrough and then to the second outer one of said outlets, and
    a removable closure for one end of the housing for retaining the cartridges therein.

References Cited in the file of this patent
UNITED STATES PATENTS

| | | |
|---|---|---|
| 1,940,316 | McKinley | Dec. 19, 1933 |
| 1,971,120 | Rice et al. | Aug. 21, 1934 |
| 2,253,686 | Burckhalter | Aug. 26, 1941 |
| 2,633,245 | Geiser et al. | Mar. 31, 1953 |
| 2,680,520 | Beardsley | June 8, 1954 |
| 2,933,192 | Gretzinger | Apr. 19, 1960 |
| 3,064,819 | Jones | Nov. 20, 1962 |